United States Patent
Laroia et al.

(10) Patent No.: US 6,711,120 B1
(45) Date of Patent: Mar. 23, 2004

(54) ORTHOGONAL FREQUENCY DIVISION MULTIPLEXING BASED SPREAD SPECTRUM MULTIPLE ACCESS

(75) Inventors: Rajiv Laroia, Princeton Junction, NJ (US); Junyi Li, Lakewood, NJ (US); Michaela Catalina Vanderveen, Lincroft, NJ (US)

(73) Assignee: Flarion Technologies, Inc., Bedminster, NJ (US)

( * ) Notice: Subject to any disclaimer, the term of this patent is extended or adjusted under 35 U.S.C. 154(b) by 0 days.

(21) Appl. No.: 09/266,370

(22) Filed: Mar. 11, 1999

(51) Int. Cl.[7] ................................................. H04J 9/00
(52) U.S. Cl. ........................ 370/204; 370/208; 370/343
(58) Field of Search ................................ 370/204, 203, 370/208, 209, 210, 319, 328, 344, 329, 330, 341, 343, 335, 336, 337, 479, 480; 375/130, 346, 355, 356

(56) References Cited

U.S. PATENT DOCUMENTS

| | | | | |
|---|---|---|---|---|
| 5,410,538 | A | | 4/1995 | Roche et al. .................. 370/18 |
| 5,623,487 | A | * | 4/1997 | Natali .......................... 370/342 |
| 6,067,292 | A | * | 5/2000 | Huang et al. ................ 370/342 |
| 6,088,416 | A | * | 7/2000 | Perahia et al. ............... 375/377 |
| 6,185,246 | B1 | * | 2/2001 | Gilhousen .................... 375/130 |
| 6,222,828 | B1 | * | 4/2001 | Ohlson et al. ............... 370/320 |
| 6,317,412 | B1 | * | 11/2001 | Natali et al. ................. 370/208 |
| 6,320,917 | B1 | * | 11/2001 | Stott et al. ................... 375/344 |

FOREIGN PATENT DOCUMENTS

| | | | | |
|---|---|---|---|---|
| EP | 0833 456 A2 | 4/1998 | ........... H04B/1/707 |
| EP | WO 98/59450 | 12/1998 | ............ H04J/11/00 |

OTHER PUBLICATIONS

European Patent Office Search Report, Application No. 00301560.9–2211, The Hague, Aug. 14, 2000.

Volker Aue and Gerhard P. Fettweis, "Multi–Carrier Spread Spectrum Modulation With Reduced Dynamic Range*" —IEEE Vehicular Technology Conference, Apr. 28, 1996; May 4, 1996, pp. 914–917.

G. J. Pottie and A. R. Calderbank, Channel Coding Strategies for Cellular Radio, pp. 763–770 of IEEE Transactions On Vehicular Technology, vol. 44, No. 4 (Nov. 1995).

* cited by examiner

*Primary Examiner*—Douglas Olms
*Assistant Examiner*—Brian Nguyen
(74) *Attorney, Agent, or Firm*—Straub & Pokotylo; Michael P. Straub

(57) ABSTRACT

An orthogonal frequency division multiplexing (OFDM) based spread spectrum multiple access system using offsetting between cells, and in particular, the use of tone offsetting and time offsetting, is disclosed. More specifically, frequencies that define the tone set of one cell is offset from the frequencies that define the tone set of at least one adjacent cell. In other words, if a first base station is using tones $F_1, F_2, \ldots, F_N$ within a frequency band, then a second base station adjacent to the first base station uses tones $F_1+\Delta f, F_2+\Delta f \ldots, F_N+\Delta f$ within the same frequency band. Furthermore, the symbol timing of the base-station of one cell may be offset from the symbol timing of the base-station of an adjacent cell. Thus, if a first base station starts successive symbols at times T1, T2, and T3, then a second base station adjacent to the first base station starts its respective corresponding successive symbols at times $T1+\Delta t, T2+\Delta t$, and $T3+\Delta t$. For example, in a cellular system with hexagonally shaped cells, the tone sets of two adjacent cells are offset by ⅓ of the spacing between adjacent tones, and the symbol timings of two adjacent cells are offset by ⅓ of a symbol period. Advantageously, the intercell interference is more uniformly distributed among users in a cell.

20 Claims, 2 Drawing Sheets

ORTHOGONAL FREQUENCY DIVISION MULTIPLEXING BASED SPREAD SPECTRUM MULTIPLE ACCESS

TECHNICAL FIELD

This invention relates orthogonal frequency division multiplexing (OFDM) based spread spectrum multiple access such as may be used in wireless, and other, communication systems.

BACKGROUND OF THE INVENTION

It is desired that wireless communication systems be as efficient as possible to maximize a) the number of users that can be served and b) the data rates, if data service is provided. Wireless systems are shared media systems, i.e., there is a fixed available bandwidth that must be shared among all the users of the system. These systems are often implemented as so-called "cellular" systems, where the covered territory is divided into separate cells, and each cell is served by a base station.

It is well known in the art that the two particularly desirable features of a cellular wireless system are 1) that the intracell interference, i.e., interference experienced by one user that is caused by other users that are within the same cell as that user, be as small as possible, and 2) that the intercell interference, i.e., interference experienced by one user that is caused by other users that are in cells other than the one in which the user is located, is averaged across all users in neighboring cells. Most prior art digital cellular systems are time division multiple access (TDMA) systems, such as group special mobile (GSM)-, intermediate standard (IS)-136-, or IS-54-based systems, or they are code division multiple access (CDMA) systems, e.g., IS-95 based systems.

In prior art narrow band TDMA systems neighboring base stations use different, e.g., non-overlapping, parts of the available spectrum. However, bases stations that are sufficiently far away from each other to avoid substantial interference between them, i.e., non-neighboring base stations, may use the same parts of the available spectrum. Notwithstanding such spectrum reuse, the spectrum available for use in each cell is a small part of the total available spectrum. Each user in a cell has its own unique frequency band and time slot combination, and hence TDMA systems have no intracell interference, i.e., they have the first desirable feature of cellular wireless systems. However, TDMA systems do not have the second desirable feature, in that a given user only interferes with a small number of users outside the cell, so that spectral reuse is based on worst case interference rather than average interference. As a result, the system has a low "spectral" efficiency.

In prior art direct sequence (DS)-CDMA systems the entire bandwidth is used by each base station but each base station uses a different spreading code. Such CDMA systems promise higher spectral efficiency than narrow band TDMA systems. Thus, CDMA systems have the second desirable feature of a cellular wireless system. However, CDMA systems do not have the first desirable feature of a cellular wireless system because although the signals transmitted from the base station within a cell are orthogonal, because of channel dispersion, the signals received at a receiver are not necessarily orthogonal. This results in interference between users within the same cell.

Proposed prior art frequency hopping (FH)-CDMA systems are very similar to narrow band TDMA systems, except that they employ frequency hopping to also obtain the second desirable feature of a cellular wireless system. In particular each transmitter transmits a narrow band signal, and periodically changes the carrier frequency to achieve the frequency hopping. However, disadvantageously, such hopping is relatively slow, reducing the amount of averaging that can be achieved for a given delay in the transmission path that the system can tolerate.

U.S. Pat. No. 5,410,538 issued to Roche et al. on Apr. 25, 1995 discloses a multi-tone CDMA system. Such a system is essentially an OFDM system that eliminates intracell interference by insuring that the received signals within a cell are orthogonal. Thus, the Roche et al. system has both desirable features of a cellular wireless system. However, the Roche et al. system partitions the spectrum into a large number of tones, which makes the system very susceptible to Doppler shifts in mobile systems. Also, because each mobile user transmits on a large number of tones, the peak-to-average ratio of the mobile transmitter is very high, resulting in poor power efficiency at the mobile station, which is disadvantageous in that power is often a limited resource in the mobile station.

U.S. Pat. No. 5,548,582 issued to Brajal et al. on Aug. 20, 1996 discloses a general wide-band orthogonal frequency division multiplexing (OFDM) based spread spectrum multiple access.

We have recognized in United States Patent Application Serial No. (Case Laroia 9-1-1) that the Brajal et al. system is not optimized for use in a cellular system in that there is no teaching therein how to optimize a) the hopping pattern, b) the tone assignment, or c) the bandwidth reuse. We have further recognized that optimizing these factors, individually and/or collectively, is important to obtain a spectrally efficient system, i.e., a system that has the two particularly desirable features of a cellular wireless system. In particular, we disclosed in United States Patent Application Serial No. (Case Laroia 9-1-1) dividing the entire bandwidth into orthogonal tones, and reusing all of the orthogonal tones in each cell. To reduce peak-to-average ratio at the mobile transmitter, low bit rate user, such as a voice user, is allocated preferably a single one, but no more than a very small number, of the orthogonal tones for use in communicating with the base station. Data users are similarly allocated tones for data communication. However, the number of tones assigned for each data particular user is a function of the data rate for that user. The tone assignment for a given user is not always the same within the available band, but instead the tones assigned to each user are hopped over time.

A tone hopping pattern was disclosed that achieves maximum frequency diversity and averages the intercell interference, e.g., using a pattern that is a function of a mutually orthogonal latin square. More specifically, in the downlink, i.e., in the channel from the base station to the mobile station, the tones assigned to each user are change relatively rapidly, e.g., from symbol to symbol, i.e., the user fast "hops" from one tone to another. However, in the uplink, i.e., in the channel from the mobile station to the base station, although fast hopping is possible, preferably slow hopping is employed to allow efficient modulation of the uplink signal. However, when slow hopping is used in the uplink, it is necessary to employ additional techniques, such as interleaving, to compensate for the reduction in the intercell interference averaging effect.

SUMMARY OF THE INVENTION

We have recognized that notwithstanding the foregoing advancements, additional improvements are yet necessary to achieve spectrally efficient system, i.e., a system that has the two particularly desirable features of a cellular wireless system. One such improvement, in accordance with the principles of the invention, is the use of offsetting between cells, and in particular, the use of tone offsetting and time offsetting. More specifically, in accordance with an aspect of the invention, frequencies that define the tone set of one cell is offset from the frequencies that define the tone set of at least one adjacent cell. In other words, if a first base station is using tones $F_1, F_2, \ldots, F_N$ within a frequency band, then a second base station adjacent to the first base station uses tones $F_1+\Delta f, F_2+\Delta f \ldots, F_N+\Delta f$ within the same frequency band. In accordance with another aspect of the invention, the symbol timing of the base-station of one cell is offset from the symbol timing of the base-station of an adjacent cell. Thus, if a first base station starts successive symbols at times T1, T2, and T3, then a second base station adjacent to the first base station starts its respective corresponding successive symbols at times $T1+\Delta t$, $T2+\Delta t$, and $T3+\Delta t$. For example, in a cellular system with hexagonally shaped cells, the tone sets of two adjacent cells are offset by ⅓ of the spacing between adjacent tones, and the symbol timings of two adjacent cells are offset by ⅓ of a symbol period. Advantageously, the intercell interference is more uniformly distributed among users in a cell.

DETAILED DESCRIPTION

Figure 1:
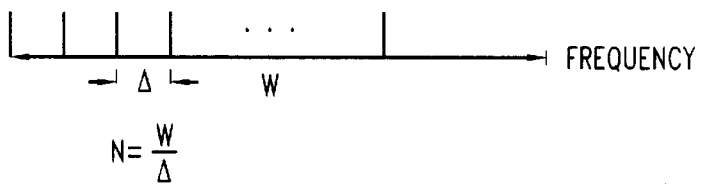
FIG. 1 shows an example of available orthogonal tones at one cell with a spacing of $\Delta$, within a bandwidth W.

The following merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the FIGS., including functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementor as more specifically understood from the context.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

Before describing the invention it is necessary to understand generally the environment in which the invention operates, namely, orthogonal frequency division multiplexing (OFDM) systems.

Orthogonal frequency division multiplexing (OFDM) systems employ orthogonal tones within a frequency bandwidth to transmit data from different users at the same time. In particular, for any particular symbol period T which is available for symbol transmission, and a given bandwidth W, the number of available orthogonal tones N, is given by WT. In accordance with an aspect of the invention, the same bandwidth W is reused in each cell. The spacing between the orthogonal tones is $\Delta$, which is given by 1/T. In addition to the symbol period T which is available for symbol transmission, an additional time Tc is required for transmission of a cyclic prefix, which is prepended to each symbol period and is used to compensate for the dispersion introduced by the channel response and the pulse shaping filter used at the transmitter. Thus, although a total period of T+Tc is employed, only T is available for user data transmission.

Figure 2:
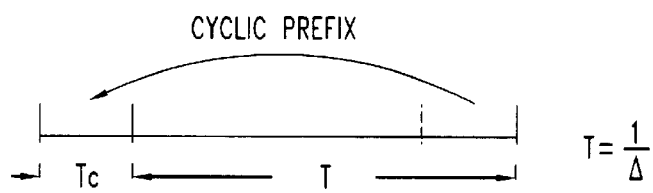
FIG. 2 shows a time domain view of the symbol period T which is available for symbol transmission, and the additional time Tc required for transmission of the cyclic prefix.

FIG. 1 shows an example of available orthogonal tones at one cell with a spacing of Δ within a bandwidth W. FIG. 2 shows a time domain view of the symbol period T which is available for symbol transmission, and the additional time Tc required for transmission of the cyclic prefix. Note that within each symbol period T data may be sent on each of the tones substantially simultaneously. Also, the last portion of the data symbol period T is often employed as the cyclic prefix in manner shown in FIG. 2.

Figure 3:
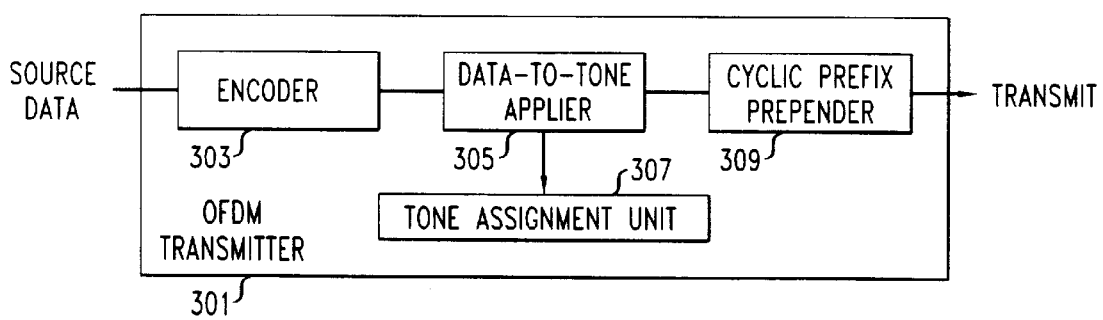
FIG. 3 shows a block diagram of an exemplary OFDM transmitter.

FIG. 3 shows a block diagram of exemplary OFDM transmitter 301. Because of its high level, whether or not the diagram of FIG. 3 depicts a prior art OFDM transmitter or an OFDM in accordance with the principles of the invention depends on the particular implementation of the various components of FIG. 3. Also, OFDM transmitter 301 may be used in either a base station as the downlink transmitter or in a mobile station as an uplink transmitter. The particular embodiments necessary for either application will be described more fully hereinbelow.

OFDM transmitter 301 includes a) encoder 303, b) data-to-tone applier 305, c) tone assignment unit 307, and d) cyclic prefix prepender 309.

Encoder 303 receives an overall information stream for transmission from a source and encodes it according to a particular encoding scheme. Such overall information stream typically includes information streams generated on behalf of more than one user if OFDM transmitter 301 is being used in a base station and only includes information streams for one user if OFDM transmitter 301 is being used in a mobile station. The encoding scheme employed may vary whether the information being transmitted in a particular information stream is voice or data. Those of ordinary skill in the art will be able to 1) select, e.g., traditional convolutional or block coding, or 2) devise, appropriate encoding schemes as a function of the model of the interference environment in which the OFDM system is being deployed.

Data-to-tone applier 305 modulates the overall encoded information stream supplied as an output from encoder 303 onto the various available tones. For each particular encoded information stream within the overall encoded information stream at least one tone is assigned by tone assignment unit 307, and that tone is used to modulate the particular encoded information stream received from encoder 303. If a particular encoded information stream is voice then, in accordance with an aspect of the invention, preferably a single one, but no more than a very small number, of the orthogonal tones are assigned for particular encoded information stream. If a particular encoded information stream is data then, in accordance with an aspect of the invention, the number of orthogonal tones assigned that particular encoded information stream is a function of the data rate for the user of that particular encoded information stream.

Tones are assigned to each encoded information stream by tone assignment unit 307, which conveys the assignments to data-to-tone applier 305. The tone assignment for a given user is not always the same within the available band, but instead the tones assigned to each user are hopped over time by tone assignment unit 307.

Cyclic prefix prepender 309 adds the cyclic prefix to each symbol period as described above. The cyclic prefix is added only for the tones being used by OFDM transmitter 301. Thus, for example, if OFDM transmitter 301 is in a base station using all of the tones, then the cyclic prefix uses all of the available orthogonal tones within bandwidth W. If OFDM transmitter 301 is in a mobile station using only a single one of the tones, then the cyclic prefix uses only that particular single tone. Advantageously, use of the cyclic prefix eliminates the need for equalization at the receiver.

Figure 4:
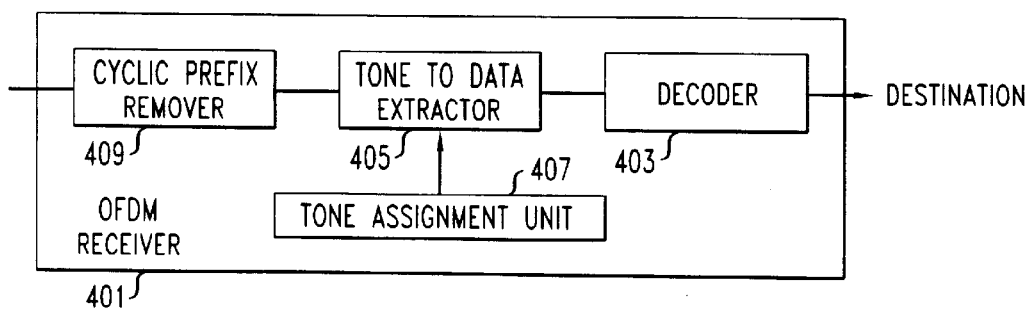
FIG. 4 shows a block diagram of an exemplary OFDM receiver.

FIG. 4 shows a block diagram of an exemplary OFDM receiver 401. As with FIG. 3 because of its high level, whether or not the diagram of FIG. 4 depicts a prior art OFDM receiver or an OFDM in accordance with the principles of the invention depends on the particular implementation of the various components of FIG. 4. Also, as shown OFDM receiver 401 may be used in either a base station as the downlink receiver or in a mobile station as an uplink receiver. The particular embodiments necessary for either application will be described more fully hereinbelow.

OFDM receiver 401 includes a) cyclic prefix remover 409, b) tone-to-data extractor 405, c) tone assignment unit 407, and d) decoder 403.

The signal received at OFDM receiver 401, e.g., by an antenna and amplifier arrangement, not shown, is supplied to cyclic prefix remover 409. Cyclic prefix remover 409 removes the cyclic prefix from each total period of the received signal. The remaining signal, with period T, is supplied to tone-to-data extractor 405.

Tone-to-data extractor 405 extracts each information stream received on the various available tones which are being used by OFDM receiver 401 to develop an overall reconstructed data stream. Tones are assigned for use by OFDM receiver 401 by tone assignment unit 407, which conveys the assignments to data-to-tone remover 405. The tone assignment for a given user is not always the same within the available band, but instead the tones assigned to each user are hopped over time by tone assignment unit 407. As a result, it is necessary that there be correspondence between tone assignment unit 307 of OFDM transmitter 301 and tone assignment unit 407 of an associated OFDM receiver 401. Such correspondence is typically achieved through a priori arrangement, e.g., upon call set up.

Decoder 403 receives an overall information stream from transmission tone-to-data extractor 405 and decodes it to develop an overall output information stream. The decoding is often performed according to the inverse of the scheme used to encode the information stream. However, modifications may be made to the decoding scheme to account for channel and other effects to produce a more reliable decoded output than simply using the inverse of the encoding scheme. Alternatively specific algorithms may be developed for use in decoding the received signal that take into account channel response, interference, and other effects. Such overall output information stream typically includes information streams generated on behalf of more than one user if OFDM receiver 401 is being used in a base station and only includes information streams for one user if OFDM receiver 401 is being used in a mobile station.

The resulting overall output stream is supplied to a destination for further processing. For example, if the information stream is voice and OFDM receiver 401 is within a mobile station, then the information stream is supplied to be converted to an audible signal that is played for the user. If the information stream is voice and OFDM receiver 401 is within a base station, the voice information may be separated for transmission to the ultimate destination, e.g., via a wireline network.

Figure 5:
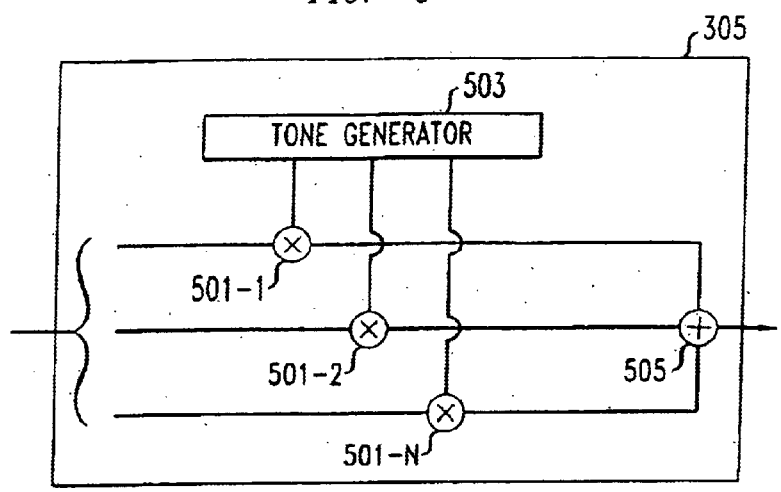
FIG. 5 shows further details of an exemplary implementation of data-to-tone applier of FIG. 3 for a base station.

FIG. 5 shows further details of an exemplary implementation of data-to-tone applier 305 for a base station. Each of multipliers 501 multiplies a particular information stream by a sinusoidal waveform which is one of the orthogonal tones and is generated by tone generator 503. The resulting modulated signals are then summed by adder 505. Typically, data-to-tone applier 305 is implemented digitally, e.g., by a processor performing the functionality of multipliers 501, tone generator 503, and adder 505 using digital representations of the orthogonal tones.

The same general architecture as shown in FIG. 5 may be used to implement data-to-tone applier 305 for a mobile station. However, instead of covering the entire range of N orthogonal tones used within the cell by the base station by having N multipliers, only the maximum number of orthogonal tones used by the mobile station need have available multipliers. Since many mobile stations are used strictly for voice, only one multiplier need be provided. However, since, as will be described in more detail hereinbelow, the tone assignments for each user are changed, it is necessary that the tone generator in a mobile station be able to generate the entire range of N orthogonal tones. Furthermore, if only one tone is used, adder 505 may be dispensed with.

As described above, the tones assigned to any particular information stream is changed periodically. This is known in the art generally as frequency hopping, and is referred to herein more specifically as tone hopping.

Figure 6:
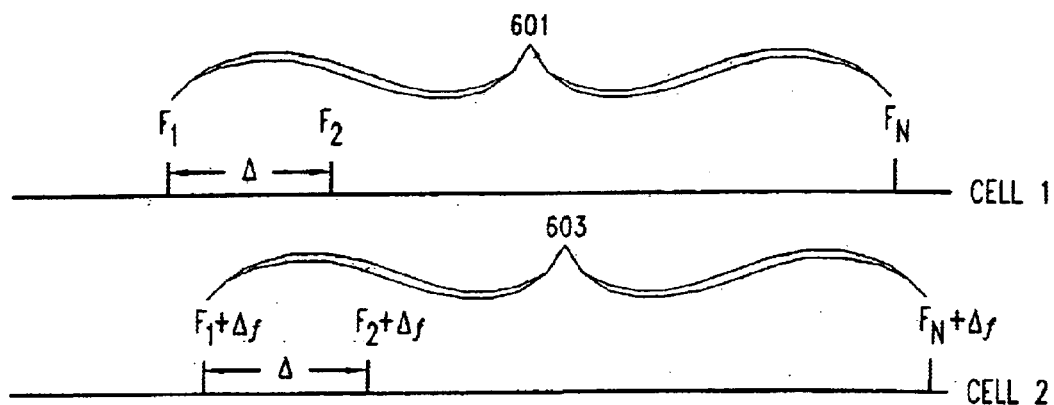
FIG. 6 shows a first tone set that is used within a first cell and in which the tones are spaced from each other by $\Delta$ and each tone of the first tone set is displaced by $\Delta f$ from each tone in a second tone set of an adjacent second cell, in accordance with the principles of the invention.

The use of the use of offsetting, e.g., tone offsetting and/or time offsetting, between cells, improves the averaging of the feeling of the effects of interference, i.e., the variance of interference power is reduced. More specifically, in accordance with an aspect of the invention, the frequencies that define the tone set of one cell is offset from the frequencies that define the tone set of at least one adjacent cell. In other words, if a first base station is using tones $F_1, F_2, \ldots, F_N$ within a frequency band, then a second base station adjacent to the first base station uses tones $F_1+\Delta f, F_2+\Delta f, \ldots F_N+\Delta f$ within the same frequency band. This is shown in FIG. 6, in which tone set 601 used within a first cell are spaced from each other by $\Delta$ and each tone of set 601 is displaced by $\Delta f$ from each tone in tone set 603 of an adjacent second cell in accordance with the principles of the invention. In one illustrative example, in a cellular system with hexagonally shaped cells, the tone sets of two adjacent cells are offset by ⅓ of the spacing $\Delta$ between adjacent tones.

Figure 7:
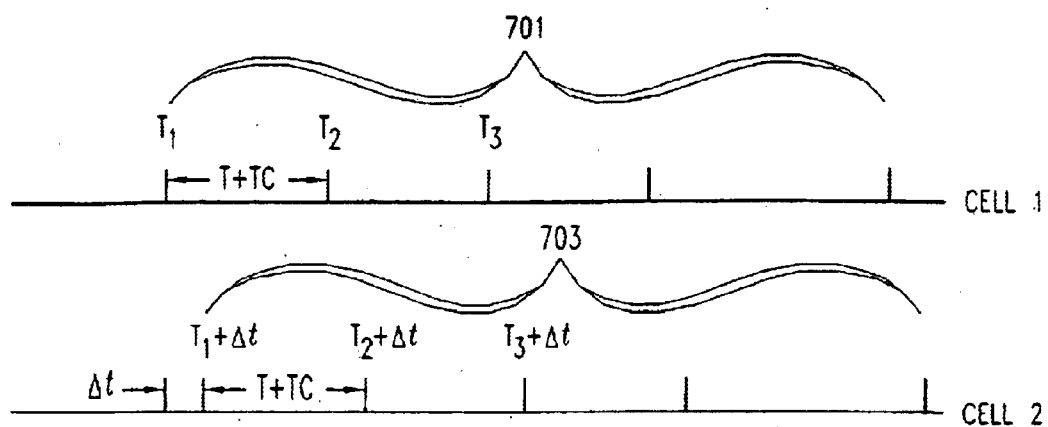
FIG. 7 shows a successive symbol start times set used within a first cell that are displaced by $\Delta t$ from each of the corresponding ones of the successive start times in second successive symbol start times set used in an adjacent second cell, in accordance with the principles of the invention.

In accordance with another aspect of the invention, the symbol timing of the base-station of one cell is offset from the symbol timing of the base-station of an adjacent cell. Thus, if a first base station starts successive symbols at times T1, T2, and T3, then a second base station adjacent to the first base station starts its respective corresponding successive symbols at times T1+$\Delta$t, T2+$\Delta$t, and T3+$\Delta$t. This is shown in FIG. 7, in which successive symbol start times set 701 used within a first cell are displaced by $\Delta$t from each of the corresponding ones of the successive start times in successive symbol start times set 703 of an adjacent second cell, in accordance with the principles of the invention. In one illustrative example, in a cellular system with hexagonally shaped cells, the symbol timings of two adjacent cells are offset by ⅓ of a symbol period. Advantageously, the intercell interference is more uniformly distributed among users in a cell.

The principles of this invention yields performance improvement over the prior art even in the event that no hopping is employed.

What is claimed is:

1. A method for operating a cellular orthogonal frequency division multiplexing (OFDM) based spread spectrum multiple access wireless system in which each base station establishes its own tone set within the same frequency band, comprising the steps of:

in a first base station corresponding to a first cell, assigning a first set of orthogonal tones, said first set of orthogonal tones being for use in communicating between said first base station and mobile units served by said first base station; and in a second base station corresponding to a second cell, located adjacent said first cell, assigning a second set of orthogonal tones, said second set of orthogonal tones being for use in communicating between said second base station and mobile units served by said second base station;

wherein said second set of orthogonal tones are placed within the same frequency band as are said first set of orthogonal tones, tones in said second set of orthogonal tones being positioned in said same frequency band at the same points but being offset by a fixed frequency offset which is smaller than the frequency separation between adjacent tones in said first set of orthogonal tones.

2. The method of claim 1, further comprising:

in said first base station, assigning a first symbol start time;

in said second base station, assigning a second symbol start time that is offset from said first symbol start time but occurs within the duration of time between said first symbol start time at which point a first symbol beings being transmitted by the first base station and the end of the transmission of said first symbol.

3. The method of claim 1, wherein the first and second base stations are located in physically adjacent cells.

4. The method of claim 3, wherein said offset is ⅓ the spacing between adjacent tones included in said first set of orthogonal tones.

5. A method for operating a cellular orthogonal frequency division multiplexing (OFDM) based spread spectrum multiple access wireless system in which each base station establishes its own tone set within the same frequency band, comprising the steps of:

in a first base station corresponding to a first cell, assigning a first set of orthogonal tones, $F_1, F_2, \ldots, F_N$, where N is the number of tones assigned in said first set of orthogonal tones, said first set of orthogonal tones being for use in communicating between said first base station and mobile units served by said first base station; and in a second base station corresponding to a second cell, located adjacent to said first cell, assigning a second set of orthogonal $F_1+\Delta f, F_2+\Delta f, \ldots F_N+\Delta f$, said second set of orthogonal tones being for use in communicating between said second base station and mobile units served by said second base station, $\Delta f$ being a fixed frequency offset which is less than the frequency spacing between two adjacent tones in said first set of orthogonal tones.

6. The method of claim 5, wherein the first and second base stations are located in physically adjacent cells.

7. A method for operating a cellular orthogonal frequency division multiplexing (OFDM) based spread spectrum multiple access wireless system in which each base station establishes its own tone set within the same frequency band, comprising the steps of:

in a first base station corresponding to a first cell, assigning a first set of parameters for communication between said first base station and mobile units served by said first base station; and in a second base station corresponding to a second cell, located adjacent to said first cell, assigning a second set of parameters for use in communication between said second base station and mobile units served by said second base station;

wherein parameters of said second set of parameters are offset from corresponding parameters of said first set of parameters, by a fixed amount corresponding to a frequency spacing which is less than the spacing between adjacent tones transmitted by said first base station.

8. The method of claim 7 wherein said offset is uniform for all members of said first and second set of parameters.

9. The method of claim 7 wherein said first and second set of parameters are tones used for OFDM communication by said first and second base stations, respectively.

10. The method of claim 7 further comprising:

operating said first and second base stations to transmit sequences of symbols, the second base station using symbol start times which are offset from the symbol start times used by said first base station by a fraction of a symbol transmission time period.

11. A method for operating a cellular orthogonal frequency division multiplexing (OFDM) based spread spectrum multiple access wireless system in which each base station establishes its own symbol start time, comprising the steps of:

in a first base station corresponding to a first cell, assigning a start time for each successive symbol;

in a second base station corresponding to a second cell, located adjacent to said first cell, assigning a start time for each successive symbol that is offset from said start time of a corresponding in time symbol in said first base station but that is offset by $\Delta t$ which is a fixed time offset that is greater than zero and less than one symbol duration.

12. A communications method comprising:

operating a first base station, corresponding to a first cell, to transmit a first sequence of data symbols; and operating a second base station, corresponding to a second cell located adjacent said first cell, to transmit a second sequence of data symbols, the second base station transmitting symbols in said second sequence at a fixed time offset from the time at which the first base station transmits data symbols in the first sequence, the fixed time offset being less than the duration of a single symbol.

13. The communications method of claim 12, wherein the fixed time offset is ⅓ a symbol duration.

14. A communications method comprising:

operating a first base station, corresponding to a first cell, to transmit a first sequence of data symbols; and operating a second base station, corresponding to a second cell, to transmit a second sequence of data symbols, the second base station transmitting symbols in said second sequence at a fixed time offset from the time at which the first base station transmits data symbols in the first sequence, the fixed time offset being less than the duration of a single symbol;

operating the first base station to transmit said data symbols using a first set of tones; and operating the second base station to transmit said data symbols using a second set of tones, the first and second sets of tones each including the same number of tones, each tone in the second set of tones having a frequency which differs from the frequency of a corresponding tone in the first set of tones by a fixed frequency offset, the fixed frequency offset being less than the frequency spacing between adjacent tones in said first set of tones.

15. A communications system comprising:

a first base station, corresponding to a first cell, said first base station including means for means for assigning a first set of tones, $F_1, F_2, \ldots, F_N$, where N is the number of tones assigned in said first set of tones, said first set of tones being for use in communicating between said first base station and mobile units served by said first base station; and a second base station, corresponding to a second cell located adjacent said first cell, said second base station including means for assigning a second set of tones $F_1+\Delta f, F_2+\Delta f, \ldots F_N+\Delta f$, said second set of orthogonal tones being for use in communicating between said second base station and mobile units served by said second base station and $\Delta f$ is a fixed frequency offset which is less than the frequency spacing between two adjacent tones in said first set of tones.

16. The communications system of claim 15, wherein the communications system further includes:

a first communications cell including said first base station; and a second communications cell including said second base, the second communications cell being physically adjacent said first communications cell.

17. The communications system of claim 16, wherein the first base station further includes means for transmitting symbols using said first set of tones at first symbol transmission start times; and wherein the second base station further includes means for transmitting symbols using said second set of tones at second symbol transmission start times, the second symbol transmission start times having values corresponding to the first transmission start times plus a fixed time offset, the fixed time offset being shorter than a symbol duration.

18. The communications system of claim 17, wherein the tones in the first and second sets of tones are orthogonal tones.

19. A multiple access communications system, comprising:

a first communications cell including a first base station, the first base station including means for assigning a start time for each of a first plurality of successive symbols; and a second communications cell adjacent said first communications cell, the second communications cell including a second base station the second base station including means for assigning a start time for each of a second plurality of successive symbols, the start time of each symbol in the second plurality of successive symbols being offset from said start time of a corresponding, in time, symbol in said first plurality of successive symbols by a fixed time offset $\Delta t$ which is greater than zero and less than one symbol duration.

20. The communication system of claim 19, wherein the first and second base stations further include means for transmitting orthogonal frequency division multiplexed signals.

* * * * *